United States Patent [19]

Meyer et al.

[11] 4,230,252
[45] Oct. 28, 1980

[54] METHOD FOR CONSTRUCTING A SUSPENSION MEMBER

[75] Inventors: Donald E. Meyer; James J. Colpaert, both of Granger; Frederick R. Fischer, South Bend; Michael E. Gatt, Osceola; David P. Koehler, South Bend, all of Ind.

[73] Assignee: The Bendix Corporation, Southfield, Mich.

[21] Appl. No.: 899,946

[22] Filed: Apr. 25, 1978

[51] Int. Cl.$^3$ .............................................. B21D 39/00
[52] U.S. Cl. .................................... 228/152; 72/367; 228/173 F
[58] Field of Search .............. 72/318, 356, 379, 367; 301/124 R, 125; 228/173 F, 144, 152, 173 C; 29/464, 444, 445

[56] References Cited

U.S. PATENT DOCUMENTS

| 1,608,905 | 11/1926 | Murray et al. | 228/173 C |
| 2,674,783 | 4/1954 | Schneider et al. | 228/173 C |
| 3,410,349 | 11/1968 | Troutman | 29/445 X |
| 3,465,418 | 9/1969 | Clark et al. | 301/124 R X |
| 3,804,467 | 4/1974 | Austermann | 301/124 R X |
| 4,095,450 | 6/1978 | Opland | 72/367 |

*Primary Examiner*—Leon Gilden
*Attorney, Agent, or Firm*—Paul David Schoenle; Ken C. Decker

[57] ABSTRACT

The present invention relates to a suspension member and the process for constructing the suspension member. The suspension member comprises a folded single sheet of metal which is enlarged at one end to couple to a wheel assembly and U-shaped at the other end to pivotally connect with a vehicle frame. The process of constructing the suspension member comprises the steps of stamping a single sheet from a piece of stock, deforming the sheet to form a pocket defining the enlarged end, folding the sheet to form a substantially rectangular cross section and welding the seam between adjoining edges of the folded sheet. In order to support a spring assembly a tube extends through the folded sheet and cooperates with the spring assembly to attach the latter to the folded sheet.

12 Claims, 20 Drawing Figures

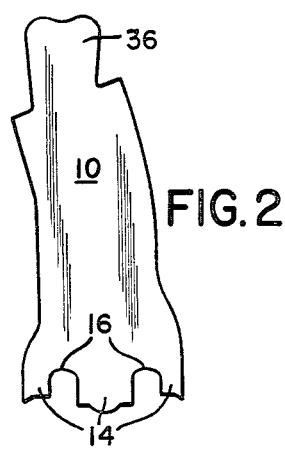 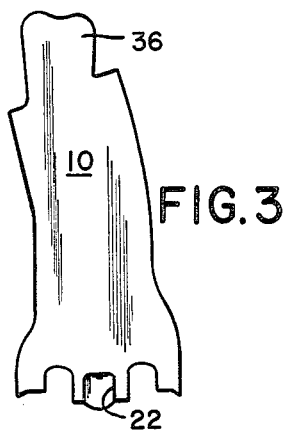 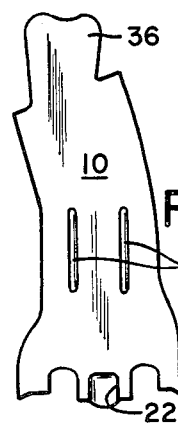
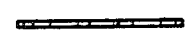  
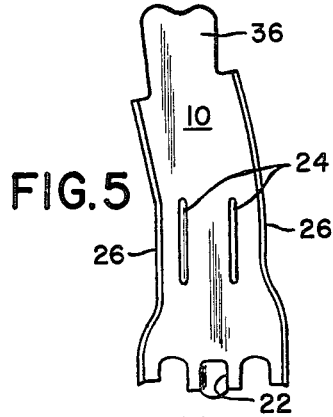 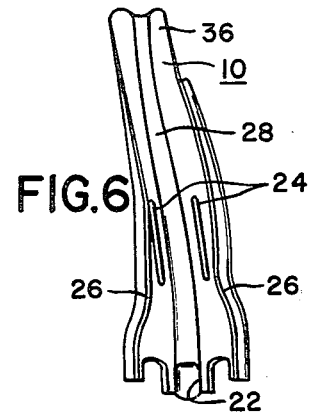
 
  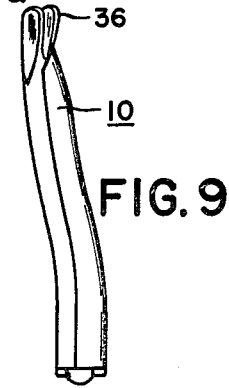
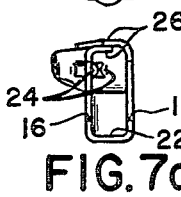 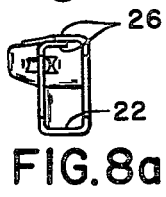 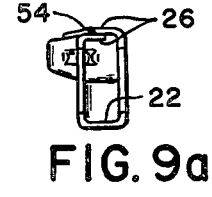

METHOD FOR CONSTRUCTING A SUSPENSION MEMBER

BACKGROUND OF THE INVENTION

In a twin beam suspension system for a vehicle a pair of beams is pivotally connected to a frame of the vehicle and each beam supports a wheel assembly remote from the pivotal connection with the frame.

In the past these beams have been forged, thereby resulting in a heavy twin beam system. With weight reduction being of utmost importance in the conservation of energy used in a vehicle, it is desirable to reduce the weight of the twin beam system without substantially diminishing the strength characteristics inherent in supporting the vehicle by a twin beam suspension system. It has been proposed to use a tube or pipe which is generally lighter in weight and is deformable to connect with a vehicle frame and wheel assembly. However, deformation of the tube has created problems in maintaining the strength and support characteristics needed in the suspension system. In addition, costly heat forming is required to shape the tube.

Consequently, a twin beam suspension system which is light weight and which meets the strength requirements of the twin beam suspension system is believed to be an advance in the state of the art.

SUMMARY OF THE INVENTION

The present invention provides a suspension member which is adapted for use in a twin beam suspension system. The process of constructing the suspension member comprises the steps of stamping a single sheet of metal from a piece of stock, deforming the sheet to form a pocket, folding the sheet to form a rectangular cross section and an enlarged end at the pocket, and welding adjoining edges of the sheet. In addition, ribs are formed on the sheet concurrently with the pocket and the ribs oppose each other when the sheet is folded to a rectangular cross section.

The suspension member forms an enlarged end which couples to a wheel assembly and the other end is substantially U-shaped and is pivotally connected to the frame of a vehicle. The portion of the suspension member between the one end and the other end decreases in cross-sectional area from the one end to the other end and the one end includes a pocket extending from one side of the suspension member to form the enlarged end. A tube extends through the folded sheet and cooperates with a spring assembly to attach the latter to the folded sheet.

The single sheet is stamped from a piece of stock and formed with a plurality of fingers at one end. The middle finger is deformed to define the pocket and a pair of fingers are folded to adjoin each other opposite the pocket. Cut outs between the plurality of fingers oppose each other after the sheet is folded in order to receive the wheel assembly.

It is a primary object of the present invention to construct a suspension member from a single flat sheet which is lighter in weight than a forged suspension member and which exhibits the same strength characteristics as a forged suspension member.

BRIEF DESCRIPTION OF THE DRAWINGS

FIG. 2 and FIG. 2a are reduced top and end views, respectively, of a flat sheet of metal after it has been stamped out of a piece of stock;

FIGS. 3 and 3a–9 and 9a show schematic top and end views of the progressive deformation of the flat sheet of metal of FIG. 1;

DETAILED DESCRIPTION

Figure 1:
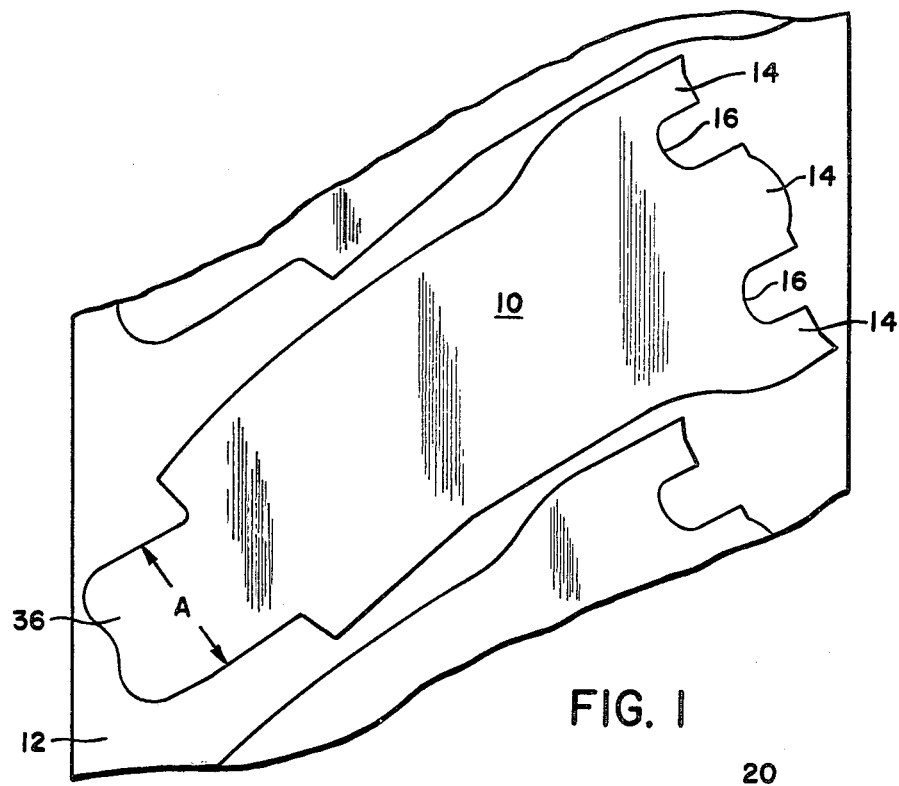
FIG. 1 is a top view of a flat sheet of metal which is to be formed into the suspension member of the present invention.

The flat sheet of metal 10 illustrated in FIG. 1 is stamped from a piece of stock 12. The sheet 10 is stamped with a plurality of fingers at 14 which are separated by cutouts 16.

Figure 10:
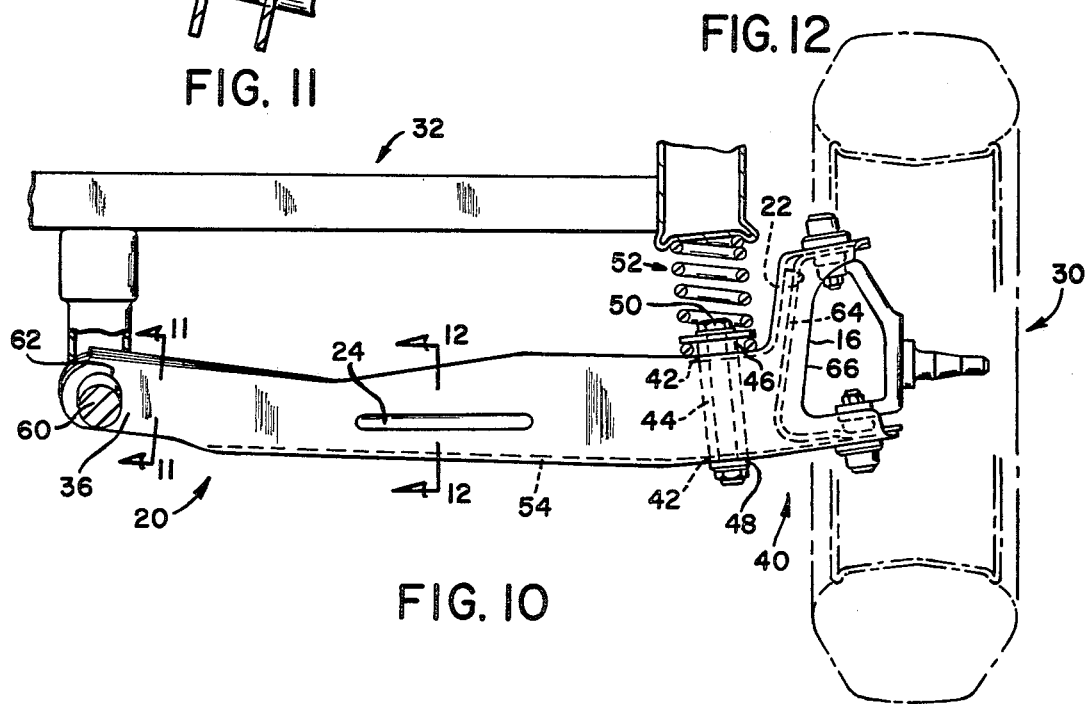
FIG. 10 is a longitudinal side view of the sheet of metal of FIG. 1 after it has been deformed according to the progression of FIGS. 2–8 which is operatively connected to a wheel assembly and a vehicle frame.

In order to construct the suspension member 20 of FIG. 10, the flat sheet 10 of FIG. 2 is subjected to a sequence of operations which deform the flat sheet as illustrated in FIGS. 3–9. In FIGS. 3 and 3a a portion of the middle finger 14 is deformed downwardly on one side of the plane of the flat sheet 10 to form a pocket 22 on the middle finger 14. This operation is performed by a suitable punch and die (not shown), the punch striking the middle finger to deform the latter into the die. Next, a pair of ribs at 24 in FIGS. 4 and 4a are formed by any suitable means, such as striking the sheet 10 with a punch to force the ribs into a die. The ribs are formed along a substantially intermediate length of the sheet 10. In FIGS. 5 and 5a the outer edges 26 are turned upwardly to begin folding of the sheet 10. In FIGS. 6 and 6a the portion of the sheet 10 extending outwardly from a middle section 28, which includes a width substantially defined by the width of the pocket 22, is bent upwardly viewing FIGS. 6 and 6a. In FIGS. 7 and 7a the outer edges 26 are brought into engagement with each other to complete the folding of the sheet 10.

During the deformation of the flat sheet 10 in the sequence shown in FIGS. 3 and 3a–7 and 7a, it may be necessary to strike the flat sheet 10 more than once to deform the flat sheet to the shape shown in each Figure.

In the folded position of FIGS. 7 and 7a the ribs 24 oppose each other and the cutouts 16 are vertically aligned to receive a wheel assembly 30 shown in FIG. 10. When the outer edges 26 adjoin each other the resulting cross section of the suspension member is substantially rectangular, notwithstanding the opposing ribs 24 which extend over a restricted length of the suspension member 20 as shown in FIG. 10.

Figure 11:
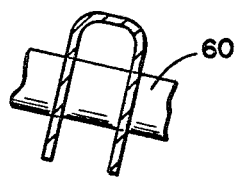
FIG. 11 is a cross section taken along line 11—11 of FIG. 10.
Figure 12:
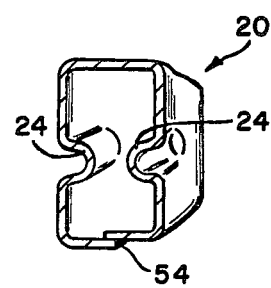
FIG. 12 is a cross section taken along line 12—12 of FIG. 10.

The flat sheet of FIG. 1 includes a reduced transverse width A at the end 36 which is opposite the plurality of fingers 14. Consequently, when the outer edges 26 are folded to form a rectangular cross section, the end 36 remains in a U-shaped cross section as illustrated in FIG. 11. In FIGS. 8 and 8a, the U-shaped end 36 is punched to reduce the width of the end 36, and in FIGS. 9 and 9a the U-shaped end 36 is twisted about 6° relative to the remaining portion of the suspension member 20 in order to adapt the twisted U-shaped end for pivotal connection with a vehicle frame 32. Thereafter the adjoining edges 26 are welded to form a seam 54.

After the folded sheet 10 is deformed to a rectangular cross section and the U-shaped end is twisted, the adjoining outer edges 26 are welded together to permanently set the shape of the suspension member 20.

Turning to FIG. 10, the folded suspension member 20 is shown after deformation of the flat sheet 10 is completed. The one end 40 includes the pocket 22 extending from one side of the suspension member 20. The cutouts 16 on the one end define a yoke which cooperates with the wheel assembly 30 to couple the one end 40 to the wheel assembly 30. The suspension member 20 is provided with aligning apertures 42 on the top and bottom sides for receiving a tube 44 which is welded to the top and bottom sides at 46 and 48. The tube 44 receives a bolt 50 which retains a spring assembly 52 in engagement with the top side of the suspension member 20. In a conventional manner the spring also engages a part of the frame 32 to permit resilient movement between the frame and suspension member and also to transmit the weight of the vehicle from the frame 32 to the suspension member 20.

The welded seam 54 between the outer edges 26 is disposed on the bottom side of the suspension member, viewing FIG. 10, opposite the pocket 22. The seam 54 extends from the one end 40 to the U-shaped other end 36, but does not cover the U-shaped end 36. The end 36 is provided with aligning apertures 62 for receiving a king pin 60 which is secured to the frame 32. Therefore, the suspension member 20 is free to pivot about the king pin 60 against the force of the spring assembly 52.

The end 40 is provided with an optional shell 64 which fits within the pocket 22 and includes matching cutouts 66 corresponding to the cutouts 16. The optional shell acts as a support to increase the strength of the end 40 as the majority of the load between the wheel assembly 30 and the frame 32 is carried through the end 40.

As illustrated in FIGS. 2-9, the single flat sheet 10 is provided with the end 36 being offset from the middle finger 14 toward the finger 14 which is at the left side. In addition, the folding steps impart a curve to the sheet 10. Consequently, the middle section 28 extending from the end 36 to the fingers 14 is curved to offset the ends. When the folded sheet is welded at 54 the U-shaped end 36 of FIGS. 7-10 remains offset from the pocket 22 of end 40 so that the suspension member 20 is nonlinear from end to end.

In the preferred embodiment the suspension member 20 is constructed from SAE-980 steel. Moreover, the deformation of the flat sheet 10 in FIGS. 3 and 3a-9 and 9a to construct the suspension member 20 is a cold forming sequence, except for the welding of the outer edges 26 to form the seam 54.

Although the suspension member 20 operates in the same manner as the forged twin beam of the prior art, the folded sheet 10 provides a simple and light weight suspension member 20 which is well suited for replacing the heavy forged twin beam of the prior art. Moreover, the method of forming the suspension member 20 from the single flat sheet 10 by folding the latter is believed to be more energy efficient than the forged beam of the prior art.

It is an important feature of the present invention that the resulting suspension member 20 is generated from a single flat sheet 10 of metal by folding the latter and providing a single weld seam 54 to permanently fix the shape of the folded sheet, thereby resulting in a substantial rectangular cross section.

There are many variations and additions to the process for constructing the foregoing suspension member and the suspension member, per se, which are feasible by one skilled in the art, and, as such, these variations and additions are covered by the scope of the appended claims.

We claim:

1. A process for constructing a suspension member for a vehicle comprising in sequence the steps of:
   (a) providing a single flat sheet;
   (b) deforming said single flat sheet to form a pocket at one end of said single flat sheet, said pocket defining a predetermined width; and
   (c) folding said single flat sheet to substantially define at first a middle section extending from the pocket to the other end, said middle section including a width substantially equal to said predetermined width and secondly a polygon cross section with said middle section forming a side of said polygon;
   (d) said folding step imparting a curve to said middle section to offset the other end of said middle section from said pocket.

2. A process for constructing a suspension member for a vehicle comprising the steps of:
   (a) stamping a flat sheet from a piece of stock, said flat sheet having a decreasing transverse width from one end to the other end and said stamping providing a pair of cutouts at the one end which separate a plurality of fingers from each other;
   (b) deforming one of said plurality of fingers to form a pocket protruding from said flat sheet;
   (c) folding said flat sheet to dispose the pair of cutouts opposite each other, a pair of fingers opposite the pocket and edges of said flat sheet adjacent each other; and
   (d) fastening the edges together with each other and the pair of fingers together with each other.

3. The process of claim 2 including twisting the other end ralative to said flat sheet after said flat sheet is folded.

4. The process of claim 2 in which said flat sheet is provided with said one end offset from said other end.

5. The process of claim 2 in which said flat sheet is folded to offset said one end from said other end.

6. The process of claim 2 in which said fastening comprises welding a single contiguous seam on said folded sheet.

7. The process of claim 6 in which said welding provides a welded seam extending from said one end to said other end but not including said other end.

8. A method for constructing a suspension member for a vehicle having a frame and a wheel assembly comprising the steps of:
   (a) stamping a single substantially flat sheet from a piece of stock, said sheet having a substantially decreasing transverse width from one end to the other end;
   (b) folding said single substantially flat sheet to form a folded single sheet having its edges overlap with each other and its ends adapted to pivotally connect said wheel assembly with said frame; and
   (c) fastening said edges together to form said suspension member with a single contiguous seam along said edges, said seam being disposed on a bottom side of said folded single sheet when said folded single sheet is adapted to connect said wheel assembly with said frame;

(d) said folding step comprising a cold forming sequence which imparts a curve to said folded single sheet during said folding step to substantially offset the one end from the other end.

9. The method of claim 8 in which said substantially flat sheet is deformed to define a pocket before said substantially flat sheet is folded.

10. The method of claim 9 in which said single contiguous seam is formed on said suspension member opposite said pocket.

11. A method for constructing a suspension member comprising the steps of:

(a) providing a substantially flat sheet, said flat sheet having edges which substantially approach each other from one end of said flat sheet to the other end;

(b) deforming said flat sheet to provide a pocket protruding from said flat sheet at the one end thereof and defining a predetermined width;

(c) folding said deformed sheet to define a folded polygonal structure having a side thereof substantially equal in width to said predetermined width, said folding step also overlapping said edges; and (d) fastening said overlapping edges to form a single contiguous seam on said folded polygonal structure, said single contiguous seam being disposed on said side opposite said pocket.

12. The method of claim 11 in which said folding step offsets said one end of said folded sheet from the other end of said folded sheet.

* * * * *